United States Patent [19]

Andersson et al.

[11] 3,819,061
[45] June 25, 1974

[54] APPARATUS FOR TRANSFERRING MATERIAL FROM AND TO PREDETERMINED POSITIONS

[75] Inventors: Emil Johan Wilgott Andersson, Hägersten; Sven Algot Gröndahl, Farsta; Nils Anders Rydahl, Hägersten; Tom Eric Österholm, Handen, all of Sweden

[73] Assignee: Aktiebolaget Electrolux, Stockholm, Sweden

[22] Filed: Feb. 7, 1972

[21] Appl. No.: 223,895

[30] Foreign Application Priority Data
Feb. 12, 1971 Sweden.............................. 1805/71

[52] U.S. Cl. .............. 214/1 BB, 214/1 CM, 408/14
[51] Int. Cl.............................................. B25j 9/00
[58] Field of Search.. 214/1 CM, 1 BB, 1 BC, 1 BD, 214/1 B; 408/14

[56] References Cited
UNITED STATES PATENTS

| 2,640,377 | 6/1953 | Millholland | 408/14 X |
| 3,051,328 | 8/1962 | Brown | 214/1 BC |
| 3,212,649 | 10/1965 | Johnson | 214/1 BC |
| 3,306,471 | 2/1967 | Devol | 214/1 BC |
| 3,422,967 | 1/1969 | Aron | 214/1 BB |
| 3,428,190 | 2/1969 | Joichi | 214/1 BB |
| 3,488,692 | 1/1970 | Oda | 214/1 BC |
| 3,543,947 | 12/1970 | Devol | 214/1 BC |
| 3,575,301 | 4/1971 | Panissidi | 214/1 BC |
| 3,658,190 | 4/1972 | Fournier | 214/1 BB |
| 3,711,212 | 1/1973 | Kuck | 408/14 |

Primary Examiner—Albert J. Makay
Assistant Examiner—George F. Abraham
Attorney, Agent, or Firm—Edmund A. Fenander

[57] ABSTRACT

Material is transferred from and to one of a plurality of predetermined positions by a robot having a plurality of transfer mechanisms which are connectible in different combinations. Material can be transferred from and to one of the predetermined positions by a single one of the transfer mechanisms or by one of any combination of transfer mechanisms in which at least two transfer mechanisms are interconnected.

5 Claims, 9 Drawing Figures

3,819,061

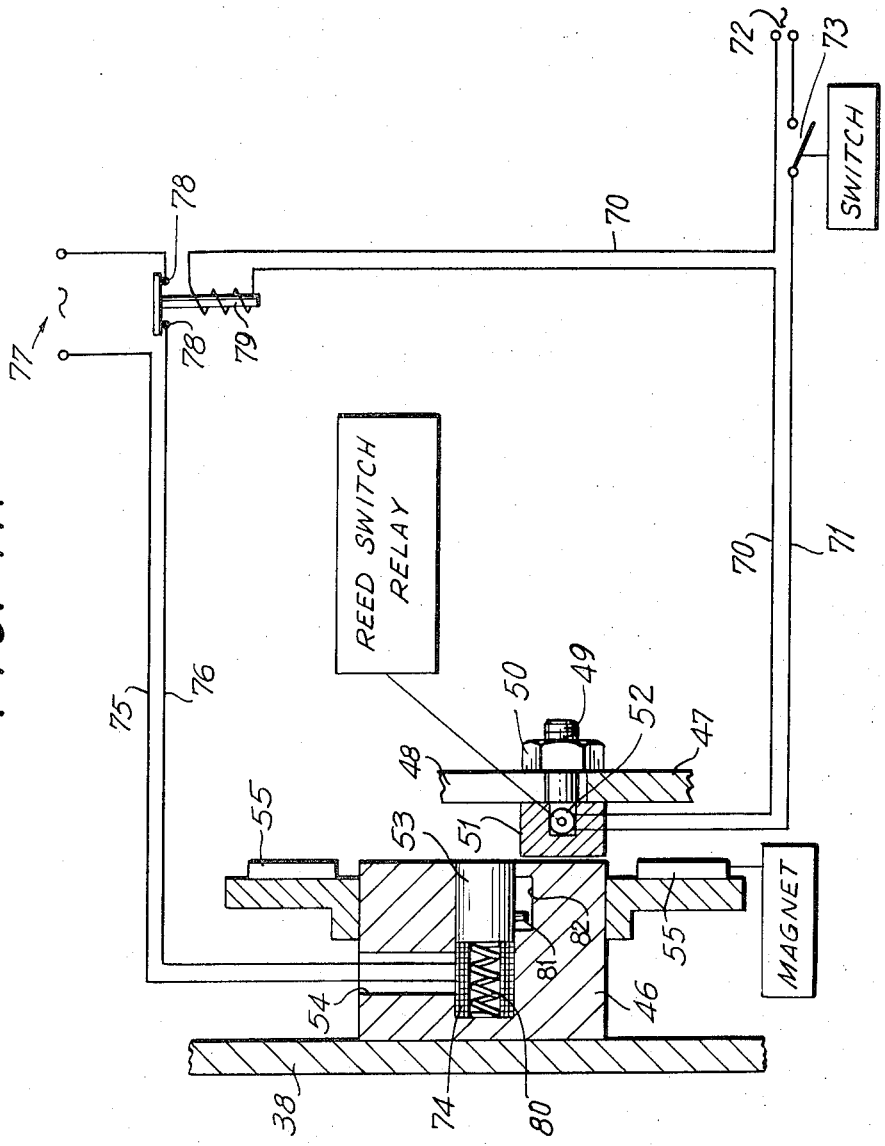

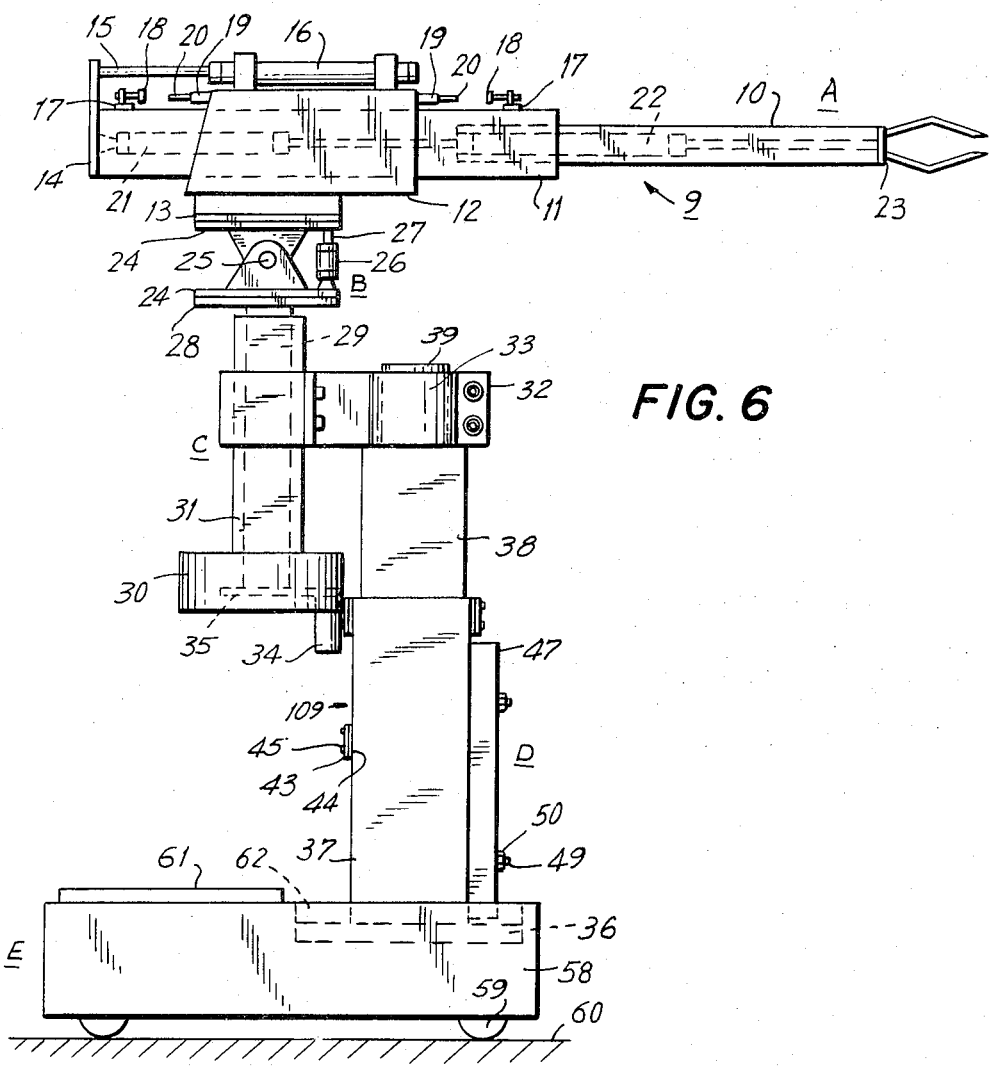
FIG. 6
FIG. 8
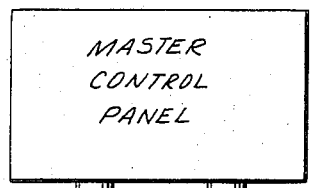
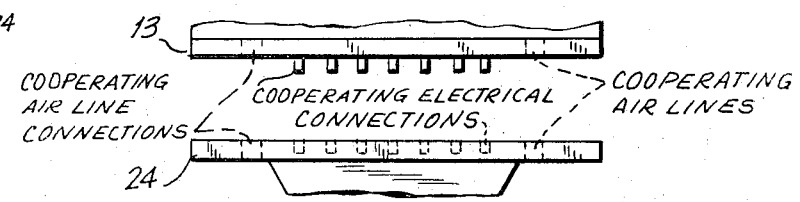

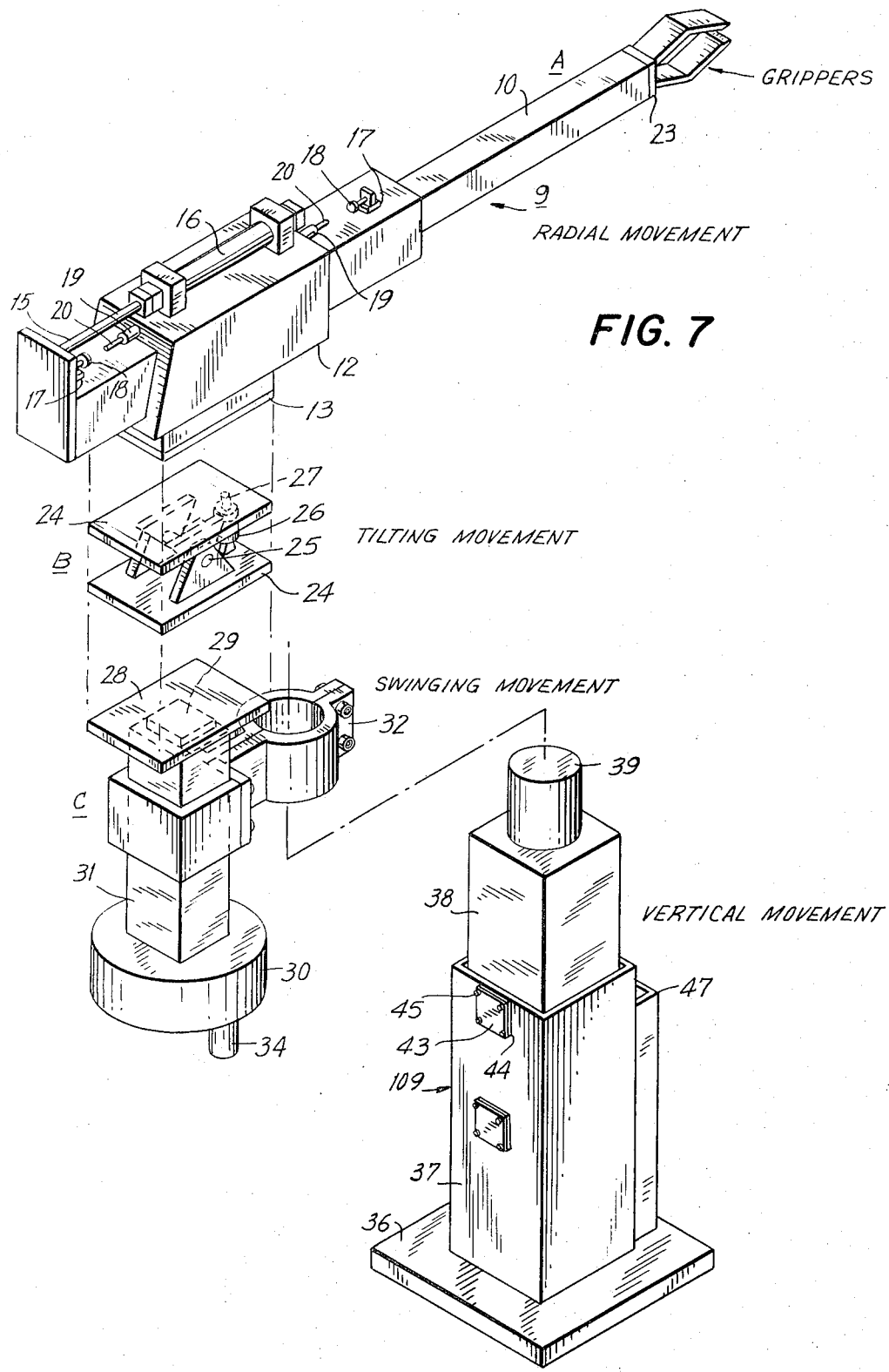

APPARATUS FOR TRANSFERRING MATERIAL FROM AND TO PREDETERMINED POSITIONS

BACKGROUND OF THE INVENTION

1. Field of the Invention

Devices referred to as robots are employed for automatically transferring articles from and to one or more predetermined positions. Such devices include one or more gripper which grasp and deliver the articles and transfer mechanism adapted to be connected to the gripper or grippers.

2. Description of the Prior Art

Robots of this kind are in common use in a variety of different manufacturing processes and this is particularly true when articles are processed in automatic tool machines. In such case the robot can automatically perform several working operations, such as, for example, transfer a detail from a conveyor belt to a processing machine to exactly position the detail in the machine. Thereafter, the robot can move the processed detail to another place such as, for example, to another machine or to a conveyor belt.

Robots heretofore provided comprise stationary equipment which are heavy, complex and costly. Such robots are constructed to perform specific working steps or operations and generally these operations cannot be altered or modified to any significant extent. Moreover, the robots are not flexible in nature and cannot be made applicable to a variety of new operations. When it is desired for a robot to automatically perform a particular or given working operation, it often has been necessary to select equipment which is more complex and costly than that required for each single purpose for the reason that only one version of a robot generally is available. This single version of the robot must be of such construction that it will be able to perform most of the operations which generally are encountered in practice. It will be evident, however, that such single version of a robot cannot embody structural features that will enable it to cover every desired purpose.

While it is possible to construct a robot for every specific purpose, this becomes entirely too expensive as a practical matter. Moreover, if the particular operation for which the robot has been constructed is no longer required in a manufacturing process and it ceases to be of importance, the robot cannot be readily used to perform new operations in another manufacturing process which is objectionable.

SUMMARY OF THE INVENTION

Our invention is concerned with transferring articles from and to one of a plurality of predetermined positions by a robot which embodies features that render it extremely flexible and capable of functioning under a wide range of operating conditions encountered in practice.

We accomplish this by providing a plurality of transfer mechanisms respectively having a variety of different movements including radial, tilting, swinging, vertical and horizontal movement. The articles can be transferred from and to one of the predetermined positions by a single one of the transfer mechanisms or by one of any combination of the transfer mechanisms in which at least two transfer mechanisms are interconnected. This produces an inexpensive and easily manufactured construction.

BRIEF DESCRIPTION OF THE DRAWING

In the drawing.

FIG. 4A schematically illustrates an electrical circuit for controlling the transfer mechanism shown in FIG. 4.

FIG. 6 schematically illustrates a robot which embodies a combination of the transfer mechanisms shown in FIGS. 1 to 5, inclusive, operatively associated with one another;

FIG. 7 is an exploded perspective view of the robot schematically illustrated in FIG. 6 with the transfer mechanism E omitted; and FIG. 8 diagrammatically illustrates the compressed air and electrical connections between a master control panel and parts of the control mechanisms illustrated in FIGS. 1, 2 and 6.

DESCRIPTION OF THE PREFERRED EMBODIMENT

Figure 1:
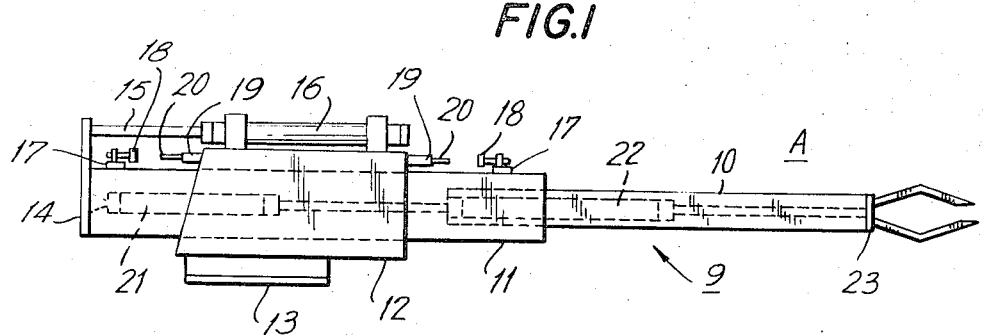
FIG. 1 is a schematic representation of a transfer mechanism of a robot which embodies our invention and has radial movement.

In FIG. 1 the transfer mechanism A embodying our invention, which has radial movement, comprises an adjustable arm 9 including inner and outer hollow members 10 and 11, respectively, which are rectangular in cross-section and formed to fit telescopically one within the other. The inner member 10 is movable lengthwise of the outer member 11 which in turn is movable lengthwise within a support 12. The support 12 also can be hollow and rectangular in cross-section. Alternatively, the support 12 can be formed from one or more brackets.

As seen in FIG. 1, the transfer mechanism A is provided with a bottom plate 13 which is connected to the support 12. The plate 13 serves to connect the transfer mechanism A to any one of the other transfer mechanisms of the robot. For this purpose the bottom plate 13 has a suitable connection or contact means which is adapted to cooperate with similar connections and contact means of parts of the other transfer mechanisms to which the plate 13 can be connected.

When the transfer mechanism A is connected to another transfer mechanism of the robot, the control systems of the two transfer mechanisms, which may be electrical or hydraulic, for example, are connected automatically. Thus, if one of the transfer mechanisms is connected to a control device, such as, for example, a central electric sequence control device, all of the transfer mechanisms connected thereto also will be connected to the control device.

To the left end of the outer rectangular member 11 is fixed a vertically disposed plate 14. The upper part of the plate 14 is connected by a horizontal rod 15 to a compresssed air cylinder 16 mounted on the support 12. The cylinder 16 functions to move the outer telescopic member 11 lengthwise of the support 12 between two end positions which are adjustable. The end positions are determined by stops 17 provided with fine adjustment means 18 which are movable on the outer telescopic member 11. In their end positions the adjustable stops strike against progressive dampers 19. The dampers 19 comprise cylindrical members having pressure rods 20.

It will be understood that all movable parts of the different transfer mechanisms, including the inner telescopic member 10 of the arm 9, can be provided with progressive dampers 19 like those just described and shown in FIG. 1.

The arm 9 is provided with two pneumatically operable cylinders 21 and 22 which are connected in series and adapted to be operated by compressed air. The cylinders 21 and 22 serve to move inner telescopic member 10 with respect to the outer telescopic member 11. Desirably, the lengths of all cylindrical strokes are selected so that the greatest distance between the adjustable stops 17 should be equal to or greater than the length of the inner rectangular telescopic member 10 when the latter is fully extended. Thus, it will be possible, with the aid of the adjustable stops 17, to make the outer end 23 of the inner telescopic member 10 stop at any point along the entire reach of the arm 9.

The outer end 23 of the arm 9 desirably is made so that an optional gripper can be attached to it. All transfer mechanisms of the robot are adapted to be operated both electrically and hydraulically and in any other suitable manner and hence the gripper also can be operated electrically or hydraulically. Thus, the gripper can comprise one or more electromagnets or hydraulically operated gripper jaws. Preferably, the arm 9 is furthermore provided with means to cause the gripper to turn, rotate or to perform any other movement.

Figure 4:
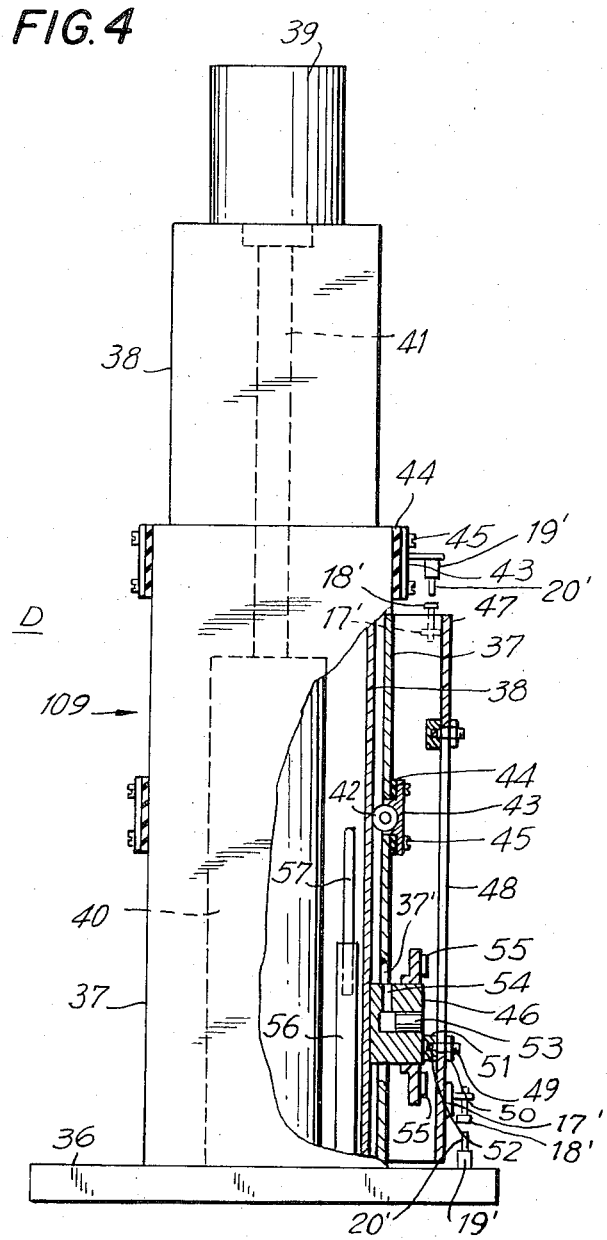
FIG. 4 schematically illustrates a still further transfer mechanism which has vertical movement and includes details which can be common for all of the transfer mechanisms of the robot.

The inner and outer telescopic members 10 and 11 desirably are supported by roller bearings in the same manner relatively movable parts are supported in the transfer mechanism shown in FIG. 4 and which will be fully described presently. The transfer mechanism shown in FIG. 4 also illustrates the manner in which compressed air can be supplied to cylinders operable to effect relative movement of parts of the transfer mechanisms. Both the arm 9 in FIG. 1 and other transfer mechanisms have or can be provided with signalling means to enable the control device to sense the effected movement. Preferably, the signalling means comprises reed members included in the electric circuits. The reed members are acted upon by magnets and are mounted in suitable places in the stationary and movable parts of the transfer mechanisms.

Figure 2:
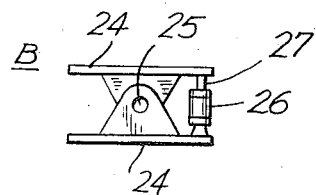
FIG. 2 schematically illustrates another transfer mechanism of the robot which has tilting movement.

In FIG. 2, the transfer mechanism B embodying our invention, which has tilting movement, comprises spaced apart plates 24 pivotally connected to one another at 25 and a cylinder 26 operable by compressed air. The plates 24 serve to connect transfer mechanism B to any one of the other transfer mechanisms. For this purpose the plates 24 have suitable connections or contact means which are adapted to cooperate with similar connections and contact means of parts of the other transfer mechanisms, such as the support 13 of the transfer mechanism A in FIG. 1, for example, to which the plates 24 can be connected.

The angle between the plates 24 is dependent on the length of the stroke of the rod 27 of the cylinder 26.

This can of course be determined in a corresponding manner as above described for the movement of the arm 9 in FIG. 1. The position reached can also be sensed by means of magnets and reed elements, as explained above in connection with the transfer mechansm A of FIG. 1.

The tilting mechanism B of FIG. 2 can, however, also be equipped with means making it possible to manually set, for instance, the two end positions of the mechanism. The pivotal connection or joint 25 can then be made so as to be easily movable in relation to the plates 24 whereby the position of the center of turning of the plates can be caused to change. Further, the length of the stroke for the compressed air cylinder 26 can be adjustable, for instance, by means of a movable sleeve or the like on the rod 27.

Figure 3:
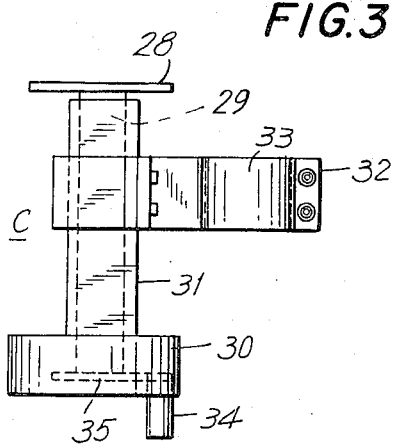
FIG. 3 schematically illustrates a further transfer mechanism of the robot which has swinging movement.

In FIG. 3 the transfer mechanism C embodying our invention, which has swinging movement, comprises a plate 28 having suitable connections or contact means which are adapted to cooperate with similar connections or contact means of parts of other transfer mechanisms to which the plate 28 can be connected.

The plate 28 is connected to the upper end of a vertical tube 29 which is rotated by a driving unit 30 including an electric motor 34 arranged to drive a gear 35 fixed to the lower end of the tube 29. The driving unit 30 is attached to an outer tube 31 to which is fixed a holder 32. The holder 32 is replaceable and can be provided with some attachment means, such as a plate like the plate 28 having suitable connections or contact means, as explained above. As shown in FIG. 3, however, the holder 32 is provided with an opening 33 which is particularly suited for connection to the transfer mechanism of FIG. 4 which has vertical movement, as will be explained hereinafter.

The driving unit 30 and the holder 32 or another part of the transfer mechanism C of FIG. 3 can be provided with connecting means for conduits from a control device as well as for other necessary conduits. With the aid of the connecting plates of the transfer mechanisms these conduits can be coupled further to the various transfer mechanisms. The connecting means can, of course, be placed in any other of the different transfer mechanisms. Likewise, several transfer mechanisms can be provided with separate connecting means.

The driving unit 30 is arranged to rotate the tube 29 only part of a revolution or several revolutions if this is required. For this purpose, the driving unit 30 is provided with means comprising rotatable air pipe connections for the hydraulic circuits, slip rings or the like for the electric circuits and position indicating means, as explained above and which will be described more fully in connection with the transfer mechanism of FIG. 4.

In FIG. 4 the transfer mechanism D embodying our invention, which has vertical movement, comprises a bottom plate 36 having suitable connections or contact means which are adapted to cooperate with similar connections or contact means of parts of other transfer mechanisms to which the bottom plate 36 can be connected.

An upright column 109, which projects upward from the bottom plate 36, includes outer and inner hollow members 37 and 38, respectively, which are rectangular in cross-section and formed to fit telescopically one within the other. The inner member 38 is movable vertically within the outer member 37 which is fixed at its lower end to the bottom plate 36.

The extreme upper end of the inner tube 38 is provided with a cylindrical-shaped part 39 which is adapted to be connected to the transfer mechanism C of FIG. 3. The opening 33 in the holder 32 in FIG. 3 is adapted to receive the part 39 in FIG. 4 for connecting the transfer mechanisms C and D to one another. In place of the part 39 it will be understood that the plate can be provided at the upper end of the member 38 which has suitable connections or contact means which are adapted to cooperate with similar connections and contact means of parts of other transfer mechanisms to which such plate can be connected.

A cylinder 40 for compressed air is mounted on the bottom plate 36 and extends upward within the inner hollow member 38. The cylinder 40 is provided with a lifting rod 41, the upper end of which is connected to the upper end of the hollow member 38. With this arrangement the cylinder 40 can be operated by compressed air to move the inner member 38 to any desired vertical position with respect to the outer hollow member 37.

The inner member 38 is supported in the outer member 37 by roller bearings 42 which are held in holders 43. Plates 44 formed of an elastomeric material like rubber, for example, are disposed between the holders 43 and the outer surface of the outer hollow member 37. The plates 44 are maintained under compression by screws 45 to provide an accurate adjustment of the roller bearings 42 with respect to the outer and inner members 37 and 38.

At the same time the elastic material of the plates 44 is jammed at the vicinities of the screws 45 to lock the latter in position. Guiding shoulders or pins (not shown) can be provided at the edges of the holders 43 to prevent the roller bearings 42 from being positioned obliquely with respect to the inner hollow member 38 due to unequal tightening of the screws 45. The transfer mechanism A, which has inner and outer hollow members 10 and 11 rectangular in cross-section, can also be provided with supporting structure like that shown in FIG. 4 and just described for supporting inner member 10 within outer member 11.

The transfer mechanism D of FIG. 4 also includes provisions for sensing the different vertical positions to which the inner member 38 has been moved and determining the locations of these vertical positions. The sensing mechanism comprises a body 46 which is connected to the inner vertically movable member 38 and projects outward therefrom.

A vertically movable rail 47 is provided alongside the outer hollow member 37 of the upright column 109.

It will be understood that the rail 47 can be provided with adjustable stops like the stops 17 in FIG. 1 which cooperate with progressive dampers like the dampers 19 in FIG. 1.

As shown in FIG. 4, stops 17' are provided on the vertically movable rail 47, the stops 17' having movable fine adjustment means 18'. Dampers 19' which comprise cylindrical members having pressure rods 20' are provided on the bottom plate 36 and upper part of the hollow member 37, respectively.

The rail 47 is provided with an upright longitudinally extending groove 48 at which region stops 51 are held at the inside of the rail by screws 49 having tightening nuts 50. With this construction the stops 51, which are provided with reed switch relays or members 52, can be moved at will along the vertically disposed groove 48 and locked in the positions to which they are moved.

A piston 53 is movable between two end positions within the body 46 as will be described presently. By way of example, this movement of the piston 53 can be effected magnetically or in any other suitable manner, as by compressed air delivered through a passageway 54 in the body 46 to the underside of the piston 53. Further, the body 46 is provided with magnets 55 which coact with the reed switch relays or members 52, as will be explained presently.

Since the body 46 is carried by the inner tube 38 it will move vertically with the tube. The outer tube 37 is provided with an upright vertical groove or slot, partly shown at 37' in FIG. 4, to accommodate the body 46 and enable the latter to move vertically with the inner tube 38.

When downward movement of the inner hollow member or tube 38 is effected from its uppermost position by the compressed air cylinder 40, the lowest magnet 55 will pass a reed switch relays or member 52. When this occurs a control mechanism will be energized and cause the piston 53 to move outward from the body 46 to its outer position.

As shown in FIG. 4A such control mechanism may comprise an electrical circuit having conductors 70 and 71 for connecting the reed switch relay 52 to an electrical source of supply 72, a switch 73 being connected in the conductor 71. An electro-magnet 74 in the body 46 at the underside of the piston 53 is connected by conductors 75 and 76 to an electrical source of supply 77, the conductors 75 and 76 extending through the passageway 54. This circuit for the electro-magnet 74 is completed across normally closed contacts 78 of a relay 79 which is connected in the conductor 70 and de-energized when the circuit for the reed switch relay 52 is open.

When the circuit for the relay 52 is closed and the relay 79 is energized, the normally closed contacts 78 of relay 79 open and the circuit for the electro-magnet 74 is broken. When this occurs a spring 80 at the underside of the piston 53 biases the latter to its outer position. A pin 81 fixed to the piston an movable in a slot 82 in the body 46 limits outward movement of the piston. When the circuit for reed switch relay 52 is open and the relay 79 is de-energized, the contacts 78 close to complete the circuit for the electro-magnet 74 which functions to attract the piston 53 and move it inward against the biasing action of the spring 80 to its inner position shown in FIG. 4A. In such position the piston 53 can freely move vertically past the stops 51 and reed switch members 52 associated therewith.

When the lowest magnet 55 passes a reed switch relay or member 52, as described above, the relay 52 functions to complete the electrical circuit for the relay 79 which in turn opens the contacts 78 of the relay 79 and de-energizes the electro-magnet 74. When this occurs the spring 80 becomes effective to move the piston 53 to its outer position. In its outer position the piston 53 will immediately strike a stop 51 and the stops 17' on the movable rail 47 in turn will move a short distance against the action of progressive dampers 19', as shown in FIG. 4.

In this way the downward movement of the tube 38 is stopped smoothly and the tube 38 assumes a predetermined position. Several stops 51 can be used which are located at different positions along the slot or groove 48 in the rail 47.

It will be understood that an electrical control circuit like that shown in FIG. 4A will be provided for the reed switch relay or member 52 associated with each stop.

Further, the control mechanism can be programmed to render a given stop operative on each occasion.

Accordingly, the switch 73 for each electrical control circuit like that shown in FIG. 4A can be programmed to close and open at the appropriate time for the piston 53 to move outward and engage a selected stop 51.

In order to supply compressed air to movable parts of the transfer mechanism D, a stationary tube 56 can be provided which is connected to a source of supply of compressed air. A movable tube 57, which telescopically fits within the stationary tube 56, is arranged to deliver compressed air to the cylinder 40 and to the passageway 54 of body 46 in any suitable manner (not shown) under the control of the control mechanism of the transfer mechanism D. It will be understood that the telescopic joint of the tubes 56 and 57 can be made airtight with any well known sealing material.

In view of the foregoing, it will now be understood that in the transfer mechanism D in FIG. 4 the rail 47 and inner hollow member 38, which carries the body 46, are relatively movable with respect to one another. The rail 47, which can be referred to as a first member, is provided with the stops 51 which are adjustable thereon in the direction of relative movement of the rail 47 and inner member 38. The inner hollow tube 38 and body 46 mounted thereon and movable with such tube can be referred to as a second member. The piston 56 movable in the body 46 can be referred to as a bolt which is movable between an inactive position illustrated in FIG. 4 and an active position that it assumes when it moves outward beyond the right-hand side of the body 46.

Each of the stops 51 is effective to engage the bolt 53 when it is in its active position while relative movement of the first and second members 47 and 38, respectively, is being effected. Further, each of the stops 51 is ineffective to engage the bolt 53 when it is in its inactive position while relative movement of the first and second members 47 and 38 is being effected. As described above, the bolt 53 is movable from its inactive position to its active position to render a selected one of the stops 51 operable to engage the bolt while relative movement of the rail 47 and inner member 38 is being effected.

Figure 5:
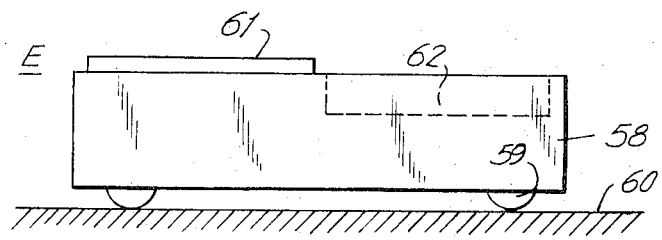
FIG. 5 schematically illustrates a still further transfer mechanism which has horizontal movement.

In FIG. 5 the transfer mechanism E embodying our invention, which has horizontal movement, comprises a mobile unit 58 having rollers 59 which can be moved horizontally on rails (not shown) or moved to selected zones or areas of a surface 60 by automatic mechanism which is controlled remotely in any well known manner. By way of example, electrical conductors can be fixed to the surface 60 which supply electrical energy to an electric motor which serves to propel the mobile unit 58. The electrical conductors can form part of electrical circuitry having suitable remote control provisions capable of effecting a particular pattern of movement of the mobile unit.

The mobile unit 58 is provided with a plate 61 having suitable connections or contact means which are adapted to cooperate with similar connections or contact means of parts of other transfer mechanisms to which the plate 61 can be connected. The mobile unit 58 also is provided with a cargo space 62 which renders the mobile unit operable to be loaded with a large number of articles at a first place and transport them to another place, such as a tool machine or storage space, for example, which may be located a considerable distance from the first place.

In view of the foregoing it will now be understood a robot embodying our invention possesses a high degree of flexibility. Only the particular article transfer mechanisms required to obtain a desired pattern of movement of the articles need be used on a given occasion because all of the transfer mechanisms are constructed so that they can be operated entirely independently of one another or in a variety of different combinations with the transfer mechanisms connected to one another. Under these conditons the overall cost of the robot always will be dependent solely upon the article movement pattern that must be developed and carried out and transfer mechanisms having features going beyond what actually is needed can be avoided.

FIG. 6 illustrates a combination of the transfer mechanisms A, B, C, D and E respectively illustrated in FIGS. 1 to 5, inclusive. In FIG. 6 parts of the robot are referred to by the same reference numerals employed to designate corresponding parts in FIGS. 1 to 5. The transfer mechanisms A, B, C, D and E in FIG. 6 are respectively employed to provide radial, tilting, swinging, vertical and horizontal movements in the same manner that these mechanisms provide their individual movements in each of FIGS. 1 to 5, as described above.

FIG. 7 is a perspective exploded view of the robot shown in FIG. 6 which brings out more clearly the operative relationship of transfer mechanisms A, B, C and D, the transfer mechanism E seen in FIG. 6 being omitted from FIG. 7.

The manner in which the electrical and compressed air connections between the transfer mechanisms can be effected is shown in FIG. 8 which schematically illustrates the plates 13 and 24 of transfer mechanisms A and B, respectively.

The transfer mechanism A can receive its electrical connections and supply of compressed air from a master control panel. The plate 24 of transfer mechanism B is formed with recesses to receive downward projecting prongs carried by plate 13 of transfer mechanism A to provide transfer mechanism B with the requisite electrical connections therefor.

The air line connections for the transfer mechanisms terminate in openings formed in the plates 13 and 24 which are in alignment and form an air-tight connection when the plates are tightly secured together in abutting relation.

Since our improved robot is not restricted to a limited pattern of movement or movement to and from a fixed place, the different transfer mechanisms forming components of our robot can be fabricated at a place where all details can be produced by rational procedures and at low cost in fully or semi-automated assembly lines. This produces an inexpensive and easily manufactured construction.

Further, the overall weight of our improved robot can be kept very low for the reason that the transfer mechanisms are of such construction that many parts and details advantageously can be formed of metal alloys which are light in weight.

We claim:

1. The combination with apparatus of the character described having a plurality of transfer mechanisms for transferring material from and to a plurality of predetermined positions, the transfer mechanisms being connectible in different combinations, of
   a. at least one such transfer mechanism having first and second parts relatively movable with respect to one another,
   b. said first member having a plurality of stops,
   c. said stops being adjustable on said first member in the direction of relative movement of said first and second members,
   d. a bolt mounted on said second member, said bolt being movable between active and inactive positions,
   e. each of said stops being 1 effective to engage said bolt when it is in its active position while relative movement of said first and second members is being effected and 2 ineffective to engage said bolt when it is in its inactive position while relative movement of said first and second members is being effected, and
   f. said bolt being movable from its inactive position to its active position to render a selected one of said stops operable to engage said bolt while relative movement of said first and second members is being effected.

2. The combination set forth in claim 1 which comprises structure including electro-magnetic means for moving said bolt between its inactive and active positions.

3. The combination set forth in claim 2 in which said structure includes resilient means biasing said bolt to its active position, said electro-magnetic means being operable to move said bolt to its inactive position against the biasing action of said resilient means.

4. The combination set forth in claim 1 which comprises means for moving said bolt between its inactive and active positions, said last-mentioned bolt moving means comprising an electrical circuit which is associated with each of said stops on said first member and includes a switch, and means including a magnet on said second movable member for selectively actuating one of said switches to complete the electrical circuit associated therewith to render said bolt moving means operable to move said bolt from its inactive to its active position.

5. The combination set forth in claim 1 in which each of said first and second members is movable with respect to the other of said first and second members, additional stops mounted on said first member, and progressive damper means coacting with said additional stops, said progressive damper means mounted on stationary parts of said apparatus.

* * * * *

UNITED STATES PATENT OFFICE
CERTIFICATE OF CORRECTION

Patent No. 3,819,061　　　　　　　　Dated June 25, 1974

Inventor(s) EMIL JOHAN WILGOTT ANDERSSON et al.

It is certified that error appears in the above-identified patent and that said Letters Patent are hereby corrected as shown below:

--Column 9, line 7, change "parts"
　　to --members--

Signed and sealed this 29th day of April 1975.

(SEAL)
Attest:

RUTH C. MASON
Attesting Officer

C. MARSHALL DANN
Commissioner of Patents
and Trademarks